United States Patent [19]

Kogan et al.

[11] 4,115,636

[45] Sep. 19, 1978

[54] MODIFIED AND STABILIZED SYNTHETIC CIS-1,4 POLYISOPRENE AND METHOD FOR PRODUCING SAME

[76] Inventors: Lev Moiseevich Kogan, prospekt Geroev, 12, kv. 130; Natalya Borisovna Monastyrskaya, Tramvainy prospekt, 18, kv. 33; Larisa Mikhailovna Davydova, ulitsa Partizana Germana, 10, korpus P, kv. 82; Elena Nikolaevna Kropacheva, Grechesky pereulok, 12, kv. 61, all of Leningrad; Izrail Markovich Belgorodsky, ulitsa K. Marxa, 50, kv. 25, Tolyatti; Olga Izrailevna Belgorodskaya, ulitsa Podvoiskogo, 24, korpus 1, kv. 313; Basia Moiseevna Bolkhovets, prospekt Geroev, 26, kv. 5, both of Leningrad; Anatoly Vasilievich Gagin, ulitsa Pobedy, 72, kv. 62, Tolyatti; Izmail Vladimirovich Garmonov, ulitsa Saltykova-Schedrina, 20, kv. 18, Leningrad; Nikolai Fedorovich Kovalev, prospekt Veteranov, 147, kv. 170, Leningrad; Vladimir Alexandrovich Krol, ulitsa Avtovskaya, 25, kv. 8, Leningrad; Anatoly Ivanovich Lukashov, ulitsa Palekhskaya, 9, korpus 1, kv. 65, Moscow; Valentin Vasilievich Sazykin, ulitsa K. Marxa, 64, kv. 8, Tolyatti; Vladislav Petrovich Smirnov, Kirovsky prospekt, 73/75, kv. 17, Leningrad; Arkady Samuilovich Estrin, prospekt K. Marxa, 33/1, kv. 35, Leningrad; Jury Alexandrovich Lvov, ulitsa Letchika Pilotova, 46, kv. 15, Leningrad; Efim Moiseevich Sire, ulitsa K. Marxa, 64, kv. 27, Tolyatti; Lidia Mikhailovna Pospelova, ulitsa Sovetskaya, 63, kv. 27, Tolyatti; Ljubov Petrovna Bataeva, ulitsa Gorkogo, 29-b, kv. 9, Tolyatti; Semen Moiseevich Kavun, ulitsa 26 Bakinskikh komissarov, 7, korpus IV, kv. 97, Moscow; Anatoly Sergeevich Lykin, poselok Kuchino, proezd Zhukovskogo, 5, kv. 64, Moskovskaya oblast, all of U.S.S.R.

[21] Appl. No.: 727,716

[22] Filed: Sep. 29, 1976

[51] Int. Cl.$^2$ ............................................. C08F 8/32
[52] U.S. Cl. ................................. 526/47.6; 526/52; 526/52.2
[58] Field of Search ....................... 526/52, 47.6, 52.2

[56] References Cited

U.S. PATENT DOCUMENTS

| | | | |
|---|---|---|---|
| 2,895,937 | 7/1959 | Baldwin et al. | 526/52 |
| 3,073,797 | 1/1963 | Fischer et al. | 260/889 |
| 3,081,279 | 3/1963 | Hammel et al. | 260/42.43 |
| 3,086,000 | 4/1963 | Wargotz | 526/51 |
| 3,322,738 | 5/1967 | Uraneck et al. | 526/52 |
| 3,367,904 | 2/1968 | Mullins et al. | 260/5 |

FOREIGN PATENT DOCUMENTS

| | | | |
|---|---|---|---|
| 1,185,896 | 3/1970 | United Kingdom | 526/52 |
| 992,210 | 3/1965 | United Kingdom | 526/48 |

*Primary Examiner*—William F. Hamrock
*Attorney, Agent, or Firm*—Lackenbach, Lilling & Siegel

[57] ABSTRACT

Modified and stabilized synthetic cis-1,4 polyisoprene is a product of chemical interaction between synthetic cis-1,4 polyisoprene containing no less than 95 percent of cis-1,4 units and 0.05 to 1 mass percent of 4-nitrosodiphenylamine.

The proposed method of making this product comprises polymerization of isoprene in hydrocarbon solvent in the presence of Ziegler-Natta catalyst, the addition to the polymerization mass of 0.05 to 1 mass percent of, and degassing and drying of the rubber thus produced.

The product possesses improved properties, including good stability in the course of storage and machining. Unvulcanized rubber mixed on the basis of this product are marked by a high adhesion strength, whereas the vulcanizates have splendid elastic hysteresis and fatigue characteristics. The quality of the novel product is in no way inferior to that of natural rubber.

7 Claims, No Drawings

MODIFIED AND STABILIZED SYNTHETIC CIS-1,4 POLYISOPRENE AND METHOD FOR PRODUCING SAME

The present invention is related to modified and stabilized synthetic cis-1,4polyisoprene and a process of producing same.

This type of rubber is applicable to the tyre production of tires, as well as the production of rubber footwear and other articles, cable insulation, etc.

At present, the industry produces synthetic cis-1,4polyisoprene which is a hydrocarbon product containing no heteroatoms chemically bonded to the polymer chain. As is well known, such heteroatoms are present in natural cis-1,4polyisoprene (NR) and account for some valuable properties thereof.

The conventional process of producing synthetic cis-1,4 polyisoprene comprises a number of successive stages, including polymerization of isoprene in hydrocarbon solvent in the presence of any of the Ziegler-Natta catalysts, deactivation or passivation of the catalytic complex, stabilization of the polymer, and degassing and drying the rubber at a temperature of 100° to 250° C.

The stabilizers, which are necessary for drying and storing synthetic cis-1,4-polyisoprene, are various compounds of the phenol and amine type.

N-substituted n-phenylene diamines are the best stabilizers. For example, in the Soviet Union, N,N'-diphenyl-n-phenylene diamine is used as a stabilizer in the production of cis-1,4polyisoprene of the CKU-3grade.

Synthetic cis-1,4-polyisoprenes possesses strength, elastic hysteresis and fatigue characteristics which are equal to those of natural rubber. However, synthetic cis-1,4-polyisoprenes are inferior to natural rubber in their technological (cohesive strength, tackiness), as well as adhesion and some other properties. As a result, synthetic cis-1,4-polyisoprenes cannot replace natural rubber, although the manufacture of the latter is far more labor-consuming.

In order to eliminate the above disadvantages, the Soviet Union and some other countries have evolved a number of processes for the production of modified cis-1,4-polyisoprene. Such processes prescribe the introduction into the polymer chain of chlorine, a halogen, phosphorus, sulphur and arsenic; a halogen and oxygen.

There are several methods known for introducing oxygen into the polymer chain, with the aid of such modifying agents as maleic anhydride. The introduction of oxygen in the polymer chain is also effected through such reactions as hydroformulation, hydrocarboxylation, metallation with subsequent carbonization, etc.

There are several more known methods for introducing into cis-1,4-polyisoprene functional groups containing an atom of nitrogen.

All the above-mentioned methods and processes account for certain changes in the properties of synthetic cis-1,4-polyisoprene. However, such changes are not always beneficial; besides, the foregoing methods and processes invariably make the production process rather complicated, which, in turn, accounts for higher production costs of synthetic rubber. These methods and processes involve the use of new chemical compounds (modifying agents); at the same time, they do not rule out the use of traditional components which are necessary for the production of synthetic cis-1,4-polyisoprene. For example, all the above methods and processes involve the use of special rubber stabilizers. It must be pointed out that none of the modified synthetic cis-1,4-polyisoprenes produced through the use of the conventional techniques has found extensive industrial application.

It is an object of the present invention to provide a relatively simple process for the production of modified and stabilized cis-1,4-polyisoprene whose properties would be better than those of the known synthetic cis-1,4-polyisoprenes, and not inferior to those of natural rubber.

The foregoing object is attained by providing modified and stabilized synthetic cis-1,4-polyisoprene which is, according to the invention, a product of chemical interaction between synthetic cis-1,4polyisoprene containing no less than 95 percent of cis-1,4units with 0.05 to 1 mass percent of 4-nitrosodiphenylamine.

In this product, 4-nitrosodiphenylamine is both a modifying and stabilizing agent.

As far as the microstructure of the polymer chain and molecular characteristics are concerned, the modified and stabilized synthetic cis-1,4 polyisoprene of this invention is similar to the known synthetic cis-1,4polyisoprenes. However, the proposed synthetic cis-1,4polyisoprene has a lesser molecular mass, a lower gel-fraction content, and a higher swelling capacity of the gel-fraction in hydrocarbon solvents. Due to its molecular properties, the synthetic cis1,4polyisoprene of the present invention lends itself perfectly to machining.

The proposed cis-1,4polyisoprene is quite stable in the course of storage and machining. Unvulcanized black stock on the basis of the proposed cis-1,4 polyisoprene possesses a high cohesive strength and tackiness; at the same time it shows good millability and extrudability and readily lends itself to calandering, which properties are typical of synthetic cis-1,4polyisoprenes. Rubbers based on the proposed product are marked by good strength with deformations as high as 300% and have an impressive combination of elastic, elastic hysteresis and fatigue characteristics. The elastic hysteresis properties (low heat build-up and low viscous friction modulus) are especially pronounced. In this respect rubbers on the basis of the modified cis-1,4polyisoprene of the present invention are superior by far to those made from natural gum elastic. In addition, the proposed product is marked by high adhesion properties which show themselves in rubber-cord and squeegee systems.

The product of this invention comprises a chemically combined stabilizer; as a result, rubber articles on the basis of the proposed product can withstand arduous conditions (organic and aqueous media and vacuum).

The present invention contemplates a method for producing the above-mentioned modified and stabilized synthetic cis-1,4polyisoprene, which comprises polymerization of isoprene in hydrocarbon solvent in the presence of Ziegler-Natta catalyst, deactivation or passivation of the catalyst, modification and stabilization of the polymer, as well as degassing and drying of said polymer at 100° to 250° C, said method being characterized, according to the invention, by that the modifying and stabilizing agent is 4-nitrosodiphenylamine taken in an account of 0.05 to 1 mass percent and introduced into the polymerization mass upon the end of the polymerization process.

It would be undesirable to alter the above percentage of 4-nitrosodiphenylamine. For example, if it is introduced in an amount of less than 0.05 mass percent, the synthetic cis-1,4 polyisoprene thus produced has no important advantages over non-modified cis-1,4 polyisoprene. On the other hand, the addition of the modifying agent in an amount of more than 1 mass percent does not improve the quality of the rubber, but makes the drying process more difficult.

According to the invention, 4-nitrosodiphenylamine is added to the polymerization mass after the polymerization process is over. This agent may be introduced as a passivator at the stage of deactivating the catalytic complex; it may also be introduced jointly with some other deactivating or passivating agent. As an alternative, 4-nitrosodiphenylamine may be added after the deactivation or passivation of the catalytic complex by other agent and partial removal of the decomposed catalyst from the polymer.

It is the most perferable that 4-nitrosodiphenylamine should be added with some other deactivator (or passivator) of the catalytic complex.

When used as a passivator of the catalyst, 4-nitrosodiphenylamine must be taken in small amounts, which substantially simplifies the manufacture of modified cis-1,4 polyisoprene. However, this technique is impractical if the catalytic complex is batched in comparatively large amounts.

According to the invention, it is preferable that the solvent should be removed from the rubber by means of water degassing. Apron or worm-type dryers are used for drying which is carried out at a temperature of 100° to 250° C.

In the course of degassing and drying the rubber, there takes place chemical interaction between the polymer and 4-nitrosodiphenylamine. However, in the case of water degassing, some 5 percent of the modifying agent is found in the effluents which, therefore, have to be purified. According to the invention, this is ruled out by warming up the polymerization mass containing 4-nitrosodiphenylamine at a temperature of 50° to 120° C, the warming-up being done prior to the degassing stage.

While the polymerization mass is being warmed up, 4-nitrosodiphenylamine is chemically combined with the hydrocarbon chain of the cis-1,4 polyisoprene.

Thus, with the use of any of the foregoing techniques of producing modified and stabilized cis-1,4 polyisoprene, 4-nitrosodiphenylamine interacts chemically with the polymer. This fact is corroborated by the impossibility of removing 4-nitrosodiphenylamine from the rubber by any of the known methods (extraction, reprecipitation, etc.). At the same time, functional groups of the modifying agent are easily found in the rubber through the use of analytical methods.

Any of the foregoing versions of the process of producing modified and stabilized cis-1,4 polyisoprene may comprise adding dispersed fillers and/or oil to the polymerization mass.

According to the invention, 4-nitrosodiphenylamine is introduced into the polymerization mass as solution in an organic solvent or as dispersion. The organic solvents used for the purpose are aromatic hydrocarbons or polar solvents, such as alcohols, ketones, amides and some others. If polar solvents are used, these must be removed from the polymerization mass and solvent; the latter is recycled. The removal is due to the fact that even taken in small amounts, polar solvents are poisons for the Ziegler-Natta catalyst.

According to the invention, in the case of introducing 4-nitrosodiphenylamine as a dispersion, the dispersive medium is either water or hydrocarbons. The stability of the dispersion is ensured through the use of different surface-active agents.

According to the invention, the manufacturing process is facilitated by using 4-nitrosodiphenylamine mixed with inert fillers which may be kaolin, chalk, white black, stearic acid, etc., or any combinations thereof.

Thus, the present invention provides a comparatively simple method of producing modified and stabilized cis-1,4 polyisoprene whose properties are superior by far to those of the non-modified polymer.

According to the invention, 4-nitrosodiphenylamine acts both as a modifying agent and stabilizer.

This agent is an intermediate product of the process for manufacturing the known stabilizer, N-isopropyl-N'-phenyl-4-phenyldiamine; 4-nitrosodiphenylamine is cheaper than the latter and, in fact than other compounds of the class of 4-phenyldiamines, although their stabilizing capacity is at the same level. This economic consideration also speaks in favor of using 4-nitrosodiphenylamine as a stabilizer.

The above-mentioned and other features and objects of this invention and the manner of attaining them will become more apparent and the invention itself will be best understood from the following examples which illustrate, but do not limit the scope of the invention.

EXAMPLE 1

Continuous polymerization of isoprene is carried out in isopentane solution in the presence of the product of interaction of triisobutylaluminium, diphenyl oxide and titanium tetrachloride to reach a 90% conversion of isoprene. The isoprene solution is directed for polymerization at a flow rate of 1 liter per hour; the isoprene content in the solution is 14 mass percent.

5% solution of 4-nitrosodiphenylamine in methanol is added at a rate of 13.5 liters per hour to the polymerization mass containing 12.6 percent by weight of cis-1,4 polyisoprene; n-nitrosodiphenylamine is batched in an amount of 0.4 mass percent relative to the mass of the polymer; the temperature of the n-nitrosodiphenylamine solution is +50° C.

The polymerization mass, containing 4-nitrosodiphenylamine, is directed to a plate washing column where methanol is washed off by water, whereas 4-nitrosodiphenylamine is uniformly distributed throughout the mass of the polymer.

The polymerization mass is then passed through a neutralizer and subjected to water degassing. The wet rubber crumb is sent to the worm-type Anderson dryer, where the polymer is dried at a temperature of 100° to 230° C; the rubber is then briquetted. After the degassing, the solution is condensed, successively treated with alkali and water, and then recycled.

This example and those that follow illustrate the production of modified and stabilized cis-1,4 polyisoprene conventionally named CKU-3M. The properties of this product are listed in Table 1. The properties of unvulcanized rubber mixes and vulcanizates on the basis of modified rubbers are listed in Table 2.

EXAMPLE 2

Isoprene is polymerized as in Example 1. The catalyst is deactivated with methanol, whereupon the deactivated catalytic complex and methanol are washed away by water. 0.2 mass percent (relative to the amount of rubber) of 4-nitrosodiphenylamine in the form of a 15.6% dispersion in water is added to the polymerization mass which contains 12.7 mass percent of cis-1,4 polyisoprene. The dispersion of 4-nitrosodiphenylamine is stabilized by a non-ionic emulsifier. Rubber is isolated by means of water degassing and dried with hot air on a three-pass apron dryer at a temperature of 100° to 120° C. After the degassing, the solvent is condensed and treated as in Example 1, whereupon it is recycled.

EXAMPLE 3

Isoprene is polymerized as in Example 1 to reach an 80% conversion. This is followed by adding to the polymerization mass, containing 11.2 mass percent of cis-1,4 polyisoprene, a mixture of 4-nitrosodiphenylamine and stearic acid (the weight ratio of the mixture's components being 1:3) in the form of an 8% solution in toluene warmed to 50° C; 4-nitrosodiphenylamine is added in an amount of 0.3 mass percent relative to the mass of the polymer. The polymerization mass is water-degassed and dryed as in Example 1.

EXAMPLE 4

Isoprene is polymerized in isopentane in the presence of a catalytic complex comprising triisobutylaluminium and titanium tetrachloride to reach an isoprene conversion of 98%. The catalyst is deactivated and removed as in Example 2, whereupon to the polymerization mass, containing 14.2 mass percent of cis-1,4 polyisoprene, there is continuously added 4-nitrosodiphenylamine in the form of a 17.8 % dispersion in water, 4-nitrosodiphenylamine being taken in an amount of 0.15 mass percent relative to the mass of the polymer. The polymerization mass is kept at a temperature of 100° C for 90 minutes, which is followed by water degassing and drying as in Example 2.

EXAMPLE 5

Isoprene is polymerized as in Example 1. The catalytic complex is passivated by gaseous ammonia, whereupon to the polymerization mass, containing 12.7 mass percent of cis-1,4 polyisoprene, there is added 0.5 mass percent (with respect to the mass of the rubber) of 4-nitrosodiphenylamine in a mixture of toluene and acetone acting as solvents (the respective ratio between the latter being 9:1). The 4-nitrosodiphenylamine content in the solution is 13.4 mass percent; the temperature of the solution is 80° C. The acetone is washed off in two steps with water. The polymerization mass is degassed with water. The wet rubber crumb is dried with hot air on a single-pass apron dryer at a temperature of 160° C. After the degassing, the solvent is condensed, thoroughly washed with water and alkali, and recycled.

EXAMPLE 6

The process is carried out as in Example 2, but 4-nitrosodiphenylamine is mixed with kaolin (the weight ratio of the components is 1:2). The concentration of this mixture in water dispersion is 21.3 percent.

EXAMPLE 7

This is a control example, i.e. the process is carried out in the conventional manner. Continuous polymerization of isoprene is carried out in isopentane solution in the presence of the product of interaction between the complex of triisobutylaluminum with diphenyl oxide and titanium tetrachloride to reach an isoprene conversion of 88%. The catalytic complex is deactivated with a mixture of toluene and methanol (the ratio between the components is 3:7). Simultaneously added to the polymerization mass with the same mixture are stabilizers - N-phenyl-$\beta$-naphthyl amine (0.52% of the mass of the polymer) and N,N'-diphenyl-n-phenylene diamine (0.26 mass percent with respect to the weight of the polymer). The concentration of the stabilizers in the mixture of toluene and methanol is 8.7 mass percent.

The polymerization mass is directed to a plate washing column, where the methanol is washed off and the deactivated catalyst is partially removed with water. The polymerization mass is then passed through a neutralizer and subjected to water degassing. The wet rubber crumb is dryed in a worm-type Anderson dryer. The drying temperature is 100° to 230° C. The dryed rubber is then briquetted.

After the degassing, the solvent is condensed, successively treated with alkali and water and recycled.

EXample 7 illustrates a process for industrial production of synthetic cis-1,4 polyisoprene of the CKU-3grade. Tables 1 and 2 list the properties of this polymer, as well as of rubber mixed and vulcanizates on its basis, which properties are compared with those of the modified and stabilized synthetic cis-1,4 polyisoprene of the present invention.

Table 3 lists the results of a comprehensive comparative analysis of synthetic cis-1,4 polyisoprenes (CKU-3M and CKU-3) and natural rubber (NR).

Examples 1 through 7 and Tables 1, 2 and 3 show that the proposed process for manufacturing modified and stabilized rubber of the CKU-3M grade is relatively simple (some versions of this process are simpler than the process of producing rubber of the conventional CKU-3grade). At the same time, the rubber produced in accordance with the invention has a variety of properties which are comparable with those of natural rubber.

Table 1

PROPERTIES OF SYNTHETIC CIS-1,4 POLYISOPRENES

| Grade of cis-1,4 polyisoprene | Microstructure of polymer chain, % of units cis-1,4 | Microstructure of polymer chain, % of units 3,4 | Content of chemically combined nitrosodiphenyl amine mass % | Intrinsic viscosity in benzol at 25° C Initial $[\eta_o]$ | Intrinsic viscosity in benzol at 25° C After warming up in oxygen at 130° C during 30 min $[\eta_t]$ | Degradation coefficient $\frac{1}{\eta_t} - \frac{1}{\eta_o}$ | Gel-fraction content in N-heptane, % | Swelling coefficient of gel-fraction, % | Solubility in toluene, % |
|---|---|---|---|---|---|---|---|---|---|
| CKμ-3M (Example 1) | 97.6 | 1.8 | 0.37 | 3.52 | 2.80 | 0.07 | 14.5 | 42 | 99.2 |
| CKμ-3M (Example 2) | 98.1 | 1.7 | 0.18 | 3.24 | 2.49 | 0.09 | 27.6 | 32.0 | 98.2 |

Table 1-continued

PROPERTIES OF SYNTHETIC CIS-1,4 POLYISOPRENES

| | | | | | | | | | |
|---|---|---|---|---|---|---|---|---|---|
| CKμ-3M (Example 3) | 97.8 | 2.0 | 0.26 | 3.86 | 2.90 | 0.09 | 21.4 | 37.2 | 98.4 |
| CKμ-3M (Example 5) | 96.8 | 2.7 | 0.44 | 3.10 | 2.50 | 0.08 | 13.2 | 43.5 | 99.4 |
| CKμ-3M (Example 6) | 98.3 | 1.4 | 0.17 | 3.68 | 2.80 | 0.09 | 27.2 | 31.6 | 98.1 |
| CKμ-3M (Example 7) | 97.2 | 2.3 | — | 3.72 | 2.72 | 0.10 | 29.5 | 30.0 | 98.1 |

| Mooney viscosity | Karrer plasticity Initial | After warming up at 100° C during 6 hours | After warming up at 120° C during 3 hours | Wallace plasticity conservation index during 30 min. |
|---|---|---|---|---|
| 66 | 0.36 | 0.36 | 0.40 | 71 |
| 63 | 0.38 | 0.39 | 0.43 | 65 |
| 72 | 0.33 | 0.35 | 0.38 | 71 |
| 61 | 0.41 | 0.41 | 0.43 | 76 |
| 70 | 0.37 | 0.39 | 0.44 | 66 |
| 65 | 0.35 | 0.37 | 0.41 | 70 |

Table 2

PROPERTIES OF UNVULCANIZED BACK RUBBER MIXES AND VULCANIZATES ON THE BASIS OF CIS-1,4 POLYISOPRENES (STANDARD BREAKER BLACK FORMULA)

| Properties | Grade of cis-1,4 polyisoprene | CKμ-3M (Example 1) | CKμ-3M (Example 3) | CKμ-3M (Example 4) | CKμ-3M (Example 7) |
|---|---|---|---|---|---|
| Properties of black mixes: | | | | | |
| Karrer plasticity | | 0.32 | 0.34 | 0.41 | 0.38 |
| Stress at 400% elongation, kgf/cm² | | 4.8 | 4.0 | 3.2 | 1.2 |
| Tensile strength, kgf/cm² | | 14.0 | 13.5 | 10.2 | 0.7 |
| Properties of rubber: | | | | | |
| Stress at 300% elongation, kgf/cm² | | 149 | 125 | 135 | 99 |
| Tensile strength, kgf/cm² | | | | | |
| at 22° C | | 296 | 297 | 293 | 269 |
| at 100° C | | 186 | 202 | 174 | 175 |
| Percentage elongation, % | | 505 | 510 | 525 | 550 |
| at 20° C | | 55 | 54 | 50 | 44 |
| at 100° C | | 72 | 69 | 63 | 60 |

Table 3

Properties of Breaker Mixed and Rubbers on the Basis of Natural and Synthetic CIS-1,4 Polyisoprenes

| Property 1 | Grade | CKμ-3M (Example 1) 2 | NR 3 | CKμ-3 4 |
|---|---|---|---|---|
| Cohesion properties of unvulcanized rubber mixed (load, kgf/cm²) | | | | |
| at 400% deformation | | 4.8 | 6.2 | 1.6 |
| at rupture stress | | 14.0 | 15.1 | 1.3 |
| Properties of rubber: | | | | |
| Stress at 300% elongation, kgf/cm² | | 149 | 150 | 134 |
| Tensile strength, kgf/cm² | | | | |
| at 20° C | | 296 | 306 | 294 |
| at 100° C | | 186 | 194 | 182 |
| Strength after 48 hours of ageing at 100° C, kgf/cm² | | 282 | 292 | 246 |
| Relative elongation, % | | 505 | 520 | 550 |
| Tear strength, kgf | | | | |
| at 20° C | | 114 | 134 | 110 |
| at 100° C | | 45 | 52 | 46 |
| Shore hardness, TM-2 | | 60 | 63 | 61 |
| Rebound elasticity, % | | | | |
| at 20° C | | 55 | 50 | 48 |
| at 100° C | | 72 | 65 | 60 |
| Heat build-up on Goodrich flexometer, T° C | | 57 | 60.5 | 61.5 |
| Pre-destruction time, min | | 60 | 35 | 30 |
| Flexing tests at 30% deformation | | | | |
| Heat build-up, T° C | | 101 | 125 | 122 |
| Pre-destruction time, min | | 360 | 180 | 150 |
| Biderman dynamic properties: | | | | |
| 20° C, internal friction modulus, K, kfg/cm² | | 8.9 | 10.6 | 10.7 |
| Dynamic modulus E, kgf/cm² | | 42.0 | 42.2 | 42.3 |
| relative hysteresis | | | | |
| k/e | | 0.21 | 0.25 | 0.25 |
| 100° C, K, kgf/cm² | | 4.8 | 6.3 | 6.4 |
| E, kgf/cm² | | 37.0 | 37.6 | 37.8 |
| k/e | | 0.13 | 0.17 | 0.17 |
| Low-temperature resistance | | | | |

Table 3-continued

Properties of Breaker Mixed and Rubbers on the Basis of Natural and Synthetic CIS-1,4 Polyisoprenes

| Property 1 | Grade | CKμ-3M (Example 1) 2 | NR 3 | CKμ-3 4 |
|---|---|---|---|---|
| coefficient at minus 45° C | | 0.64 | 0.52 | 0.53 |

What is claimed is:

1. A method for producing modified and stabilized synthetic cis-1,4 polyisoprene comprising polymerization of isoprene in a hydrocarbon solvent in the presence of a Ziegler-Natta catalyst, contacting the polymerization mass with 0.05 to 1 mass percent of 4-nitrosodiphenylamine, and degassing and drying the rubber thus produced at 100° to 250° C.

2. A method as claimed in claim 1, whereby 4-nitrosodiphenylamine is added to the polymerization mass jointly with a catalyst deactivating or passivating agent.

3. A method as claimed in claim 1, wherein 4-nitrosodiphenylamine is added to the polymerization mass following the deactivation of the catalyst and partial removal of the deactivated catalyst from the polymerization mass, or following the passivation of the catalyst.

4. A method as claimed in claim 1, whereby the polymerization mass containing 4-nitrosodiphenylamine is warmed up, prior to the degassing stage, at a temperature of 50° to 120° C.

5. A method as claimed in claim 1, wherein 4-nitrosodiphenylamine is used as solution in an organic solvent or as dispersion.

6. A method as claimed in claim 1, wherein 4-nitrosodiphenylamine is used as a mixture with an inactive filler.

7. A product formed by the method of claim 1.

* * * * *